United States Patent [19]

Pfiefer et al.

[11] Patent Number: 5,896,560
[45] Date of Patent: Apr. 20, 1999

[54] TRANSMIT CONTROL SYSTEM USING IN-BAND TONE SIGNALLING

[75] Inventors: Steve Pfiefer, Owatonna; Donald R. Bauman; James K. Lyon, both of Waseca, all of Minn.

[73] Assignee: Transcrypt International/E. F. Johnson Company, Burnsville, Minn.

[21] Appl. No.: 08/631,866

[22] Filed: Apr. 12, 1996

[51] Int. Cl.$^6$ .................................................. H04Q 7/00
[52] U.S. Cl. .......................... 455/35.1; 455/515; 379/386
[58] Field of Search ........................... 455/33.1, 54.1, 455/56.1, 58.2, 57.1, 68, 35.1, 36.1, 37.1, 38.2, 38.5, 32.1, 509, 515, 517, 518, 521, 526, 528; 379/59, 60, 283, 351, 386

[56] References Cited

U.S. PATENT DOCUMENTS

| | | | |
|---|---|---|---|
| Re. 34,036 | 8/1992 | McGeehan et al. | 455/71 |
| 3,867,700 | 2/1975 | Wycoff | 325/50 |
| 4,085,368 | 4/1978 | Yeh | 325/304 |
| 4,125,744 | 11/1978 | Goodall | 179/1.5 R |
| 4,131,849 | 12/1978 | Freeburg et al. | 455/54.1 |
| 4,131,850 | 12/1978 | Wilcox | 325/137 |
| 4,255,620 | 3/1981 | Harris et al. | 179/15.55 |
| 4,281,413 | 7/1981 | Forrest | 455/45.1 |
| 4,325,057 | 4/1982 | Bishop | 455/57.1 |
| 4,406,016 | 9/1983 | Abrams et al. | 455/19 |
| 4,490,830 | 12/1984 | Kai | 375/40 |
| 4,516,269 | 5/1985 | Krinock | 455/51 |
| 4,608,686 | 8/1986 | Barsellotti | 370/69.1 |

(List continued on next page.)

FOREIGN PATENT DOCUMENTS

| | | |
|---|---|---|
| 0004702 | 10/1979 | European Pat. Off. . |
| 0020893 | 1/1981 | European Pat. Off. . |
| 0515214 | 11/1992 | European Pat. Off. . |
| 0551126 | 7/1993 | European Pat. Off. . |
| 3203678 | 8/1983 | Germany . |
| 6508593 | 1/1967 | Netherlands . |
| 1574599 | 4/1977 | United Kingdom . |
| WO93/07681 | 4/1993 | WIPO . |
| WO93/11614 | 6/1993 | WIPO . |

OTHER PUBLICATIONS

Hattori, T., et al., "Theoretical Studies of a Simulcast Digital Radio Paging System Using a Carrier Frequency Offset Strategy", *IEEE Transactions on Vehicular Technology*, vol. VT-29, No. 1, pp. 87-95 (Feb. 1980).

Andreas Antoniou, "Digital Filters: Analysis and Design", *McGraw-Hill, Inc., ed. : Frank Cerra*, 214-215, (1979).

Simon Haykin, "Communication Systems,", *2nd Edition, John Wiley & Sons, Inc.*, 141-146, 171-172, (1983).

K. Sam Shanmugam, "Digital and Analog Communication Systems", *John Wiley & Sons, Inc.*, pp. 268-272, 321-322, (1979).

Donald K. Weaver, Jr., "A Third Method of Generation and Detection of Single-Sideband Singnals", *Proceedings of the IRE*, 1703-1705, (Dec. 1956).

"Digital Signal Processing Applications Using the ADSP-2100 Family", *vol. 1, Prentice Hall, Inc.*, edited by Amy Mar, pp. 457-465 (1992).

Doug Hall, "DSPs ease task of detecting tones", *Personal Engineering*, pp. 69-72 (Jan. 1996).

Alisouskas, V.F., et al., *Digital and Data Communications*, pp. 88-89 & 119-126 (1985).

*Primary Examiner*—Nguyen Vo
*Assistant Examiner*—Sam Bhattacharya
*Attorney, Agent, or Firm*—Schwegman, Lundberg, Woessner & Kluth, P.A.

[57] ABSTRACT

A transmit control system using in-band tones for activating and deactivating one or more remote sites. The transmit control system detecting energy in two or more spectral regions to determine if the signal received is a harmonic signal or a signalling tone to prevent accidental deactivation of the transmitter system. In one application, a modified Goertzel algorithm is employed by a digital signal processor to provide tone detection and a two stage detection provides controlled switching in noisy environments.

21 Claims, 13 Drawing Sheets

U.S. PATENT DOCUMENTS

| | | | |
|---|---|---|---|
| 4,679,243 | 7/1987 | McGeehan et al. | 455/47 |
| 4,696,051 | 9/1987 | Breeden | 455/33 |
| 4,696,052 | 9/1987 | Breeden | 455/51 |
| 4,726,069 | 2/1988 | Stevenson | 455/46 |
| 4,802,191 | 1/1989 | McGeehan et al. | 375/43 |
| 4,803,739 | 2/1989 | Kaikoku et al. | 455/47 |
| 4,852,090 | 7/1989 | Borth | 370/104 |
| 4,862,098 | 8/1989 | Yassa et al. | 329/50 |
| 4,903,292 | 2/1990 | Dillon | 379/93 |
| 4,972,410 | 11/1990 | Cohen et al. | 370/1.1 |
| 4,994,804 | 2/1991 | Sakaguchi | 341/143 |
| 5,003,617 | 3/1991 | Epsom et al. | 455/51 |
| 5,038,403 | 8/1991 | Leitch | 455/51 |
| 5,060,240 | 10/1991 | Erickson et al. | 375/38 |
| 5,061,934 | 10/1991 | Brown et al. | 342/162 |
| 5,077,759 | 12/1991 | Nakahara | 375/107 |
| 5,105,439 | 4/1992 | Bennett et al. | 375/10 |
| 5,113,413 | 5/1992 | Brown et al. | 375/40 |
| 5,117,424 | 5/1992 | Cohen et al. | 370/105.5 |
| 5,117,503 | 5/1992 | Olson | 455/51.1 |
| 5,127,101 | 6/1992 | Rose Jr. et al. | 455/51.1 |
| 5,128,934 | 7/1992 | Jasinski | 370/84 |
| 5,131,007 | 7/1992 | Brown et al. | 375/40 |
| 5,131,010 | 7/1992 | Derrenge et al. | 375/100 |
| 5,134,630 | 7/1992 | Bateman | 375/1 |
| 5,142,692 | 8/1992 | Owen | 455/48 |
| 5,155,859 | 10/1992 | Harris et al. | 455/51.2 |
| 5,172,396 | 12/1992 | Rose, Jr. et al. | 375/107 |
| 5,184,242 | 2/1993 | Yamashita | 359/177 |
| 5,194,871 | 3/1993 | Counselman, III | 342/357 |
| 5,201,061 | 4/1993 | Goldberg et al. | 455/51.2 |
| 5,212,807 | 5/1993 | Chan | 455/33.4 |
| 5,218,621 | 6/1993 | Cudak et al. | 375/11 |
| 5,218,717 | 6/1993 | Reitberger | 455/51.2 |
| 5,227,741 | 7/1993 | Marchetto et al. | 332/100 |
| 5,239,672 | 8/1993 | Kurby et al. | 455/16 |
| 5,243,299 | 9/1993 | Marchetto et al. | 329/300 |
| 5,257,404 | 10/1993 | Goreham et al. | 455/51.2 |
| 5,261,118 | 11/1993 | Vanderspool II | 455/51.2 |
| 5,280,629 | 1/1994 | Lo Galbo et al. | 455/51.2 |
| 5,287,550 | 2/1994 | Fennell et al. | 455/51.2 |
| 5,295,178 | 3/1994 | Nickel et al. | 455/35.1 |
| 5,319,374 | 6/1994 | Desai et al. | 342/387 |
| 5,327,581 | 7/1994 | Goldberg | 455/51.2 |
| 5,353,307 | 10/1994 | Lester et al. | 375/14 |
| 5,353,342 | 10/1994 | Pietrowicz | 379/257 |
| 5,361,398 | 11/1994 | Christian et al. | 455/51.2 |
| 5,365,569 | 11/1994 | Witsaman et al. | 379/57 |
| 5,369,682 | 11/1994 | Witsaman et al. | 379/57 |
| 5,384,574 | 1/1995 | Counselman, III | 342/357 |
| 5,392,278 | 2/1995 | Teel et al. | 370/58.3 |
| 5,398,263 | 3/1995 | Vanderspool II | 375/376 |
| 5,408,681 | 4/1995 | Ressler et al. | 455/17 |
| 5,414,734 | 5/1995 | Marchetto et al. | 375/267 |
| 5,416,808 | 5/1995 | Witsaman et al. | 375/350 |
| 5,423,056 | 6/1995 | Linquist et al. | 455/33.1 |
| 5,423,058 | 6/1995 | Cudak et al. | 455/51.2 |
| 5,423,059 | 6/1995 | Lo Galbo et al. | 455/51.2 |
| 5,440,313 | 8/1995 | Osterdock et al. | 342/352 |
| 5,448,570 | 9/1995 | Toda et al. | 370/95.3 |
| 5,448,758 | 9/1995 | Grube et al. | 455/51.2 |
| 5,465,405 | 11/1995 | Baseghi et al. | 455/226.4 |
| 5,473,638 | 12/1995 | Marchetto et al. | 375/356 |
| 5,477,539 | 12/1995 | Brown | 370/84 |
| 5,481,258 | 1/1996 | Fawcett et al. | 340/825.47 |
| 5,483,575 | 1/1996 | Zandowski et al. | 379/58 |
| 5,483,670 | 1/1996 | Childress et al. | 455/34.1 |
| 5,490,172 | 2/1996 | Komara | 375/296 |
| 5,513,215 | 4/1996 | Marchetto et al. | 375/233 |
| 5,555,546 | 9/1996 | Matsumoto | 348/410 |
| 5,590,403 | 12/1996 | Cameron et al. | 455/51.2 |
| 5,619,564 | 4/1997 | Canniff et al. | 379/386 |
| 5,668,836 | 9/1997 | Smith et al. | 375/316 |

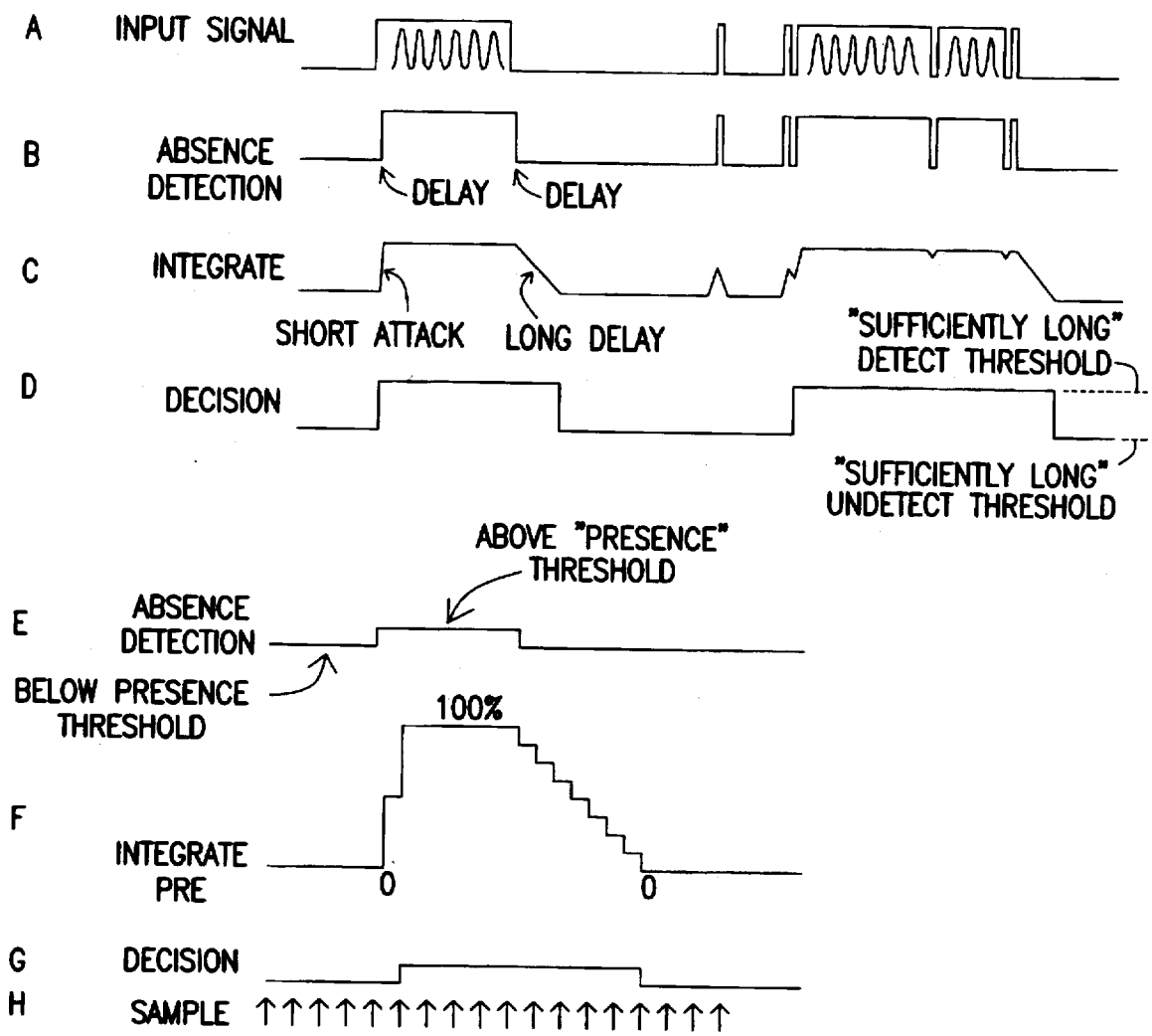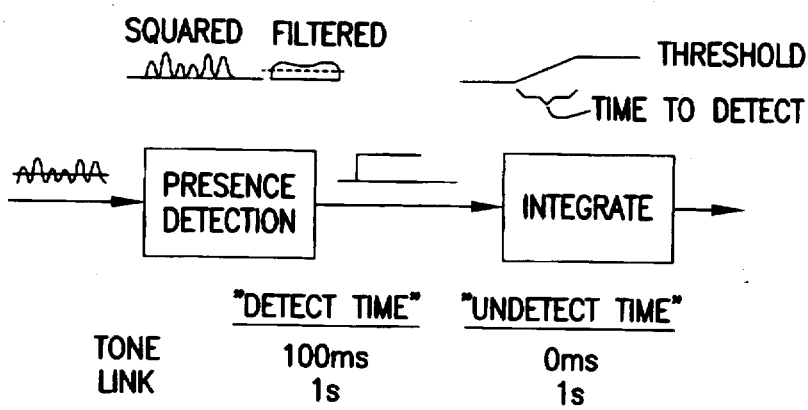
FIG. 10

CHANNEL CONTROLLER

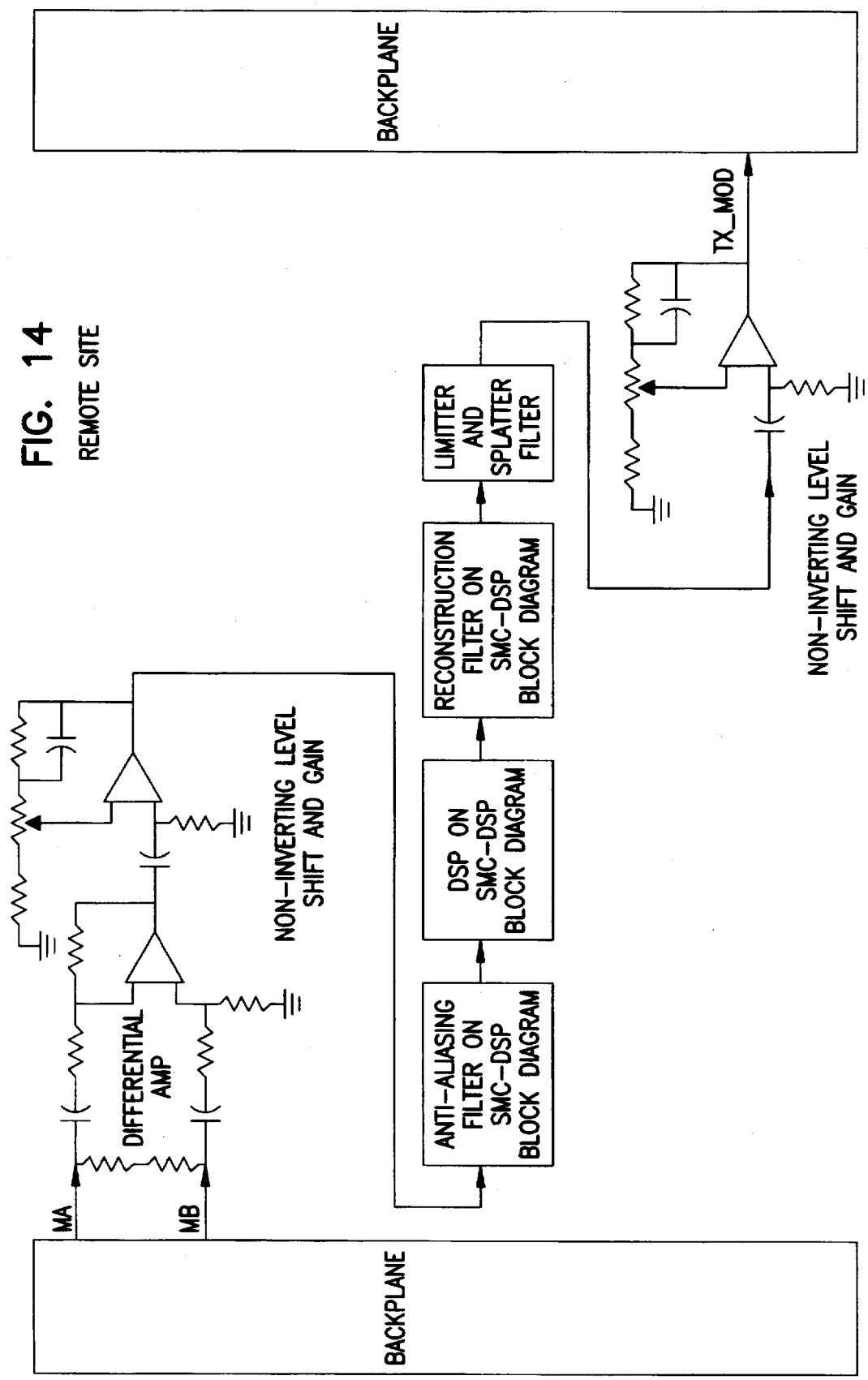

TRANSMIT CONTROL SYSTEM USING IN-BAND TONE SIGNALLING

FIELD OF THE INVENTION

The present invention relates generally to remote control using in-band signalling and in particular to transmit control and link control using in-band tone signalling in a distributed radio transmission system.

BACKGROUND OF THE INVENTION

There has been a growing interest in the use of repeater based systems for a variety of radio frequency communications. Advanced repeater systems must coordinate communications between a number of repeaters. The repeaters may be linked together using a variety of inter-repeater communications means. A remote subscriber, such as a mobile radio user, will request a channel to transmit information to other subscribers and other services connected to the repeater system. The repeater system manages the channels and provides a free channel to the calling subscriber.

However, such systems must orchestrate transmissions by each repeater. This is especially important in broadcast situations where a subscriber is communicating to a number of repeaters for rebroadcast to other subscribers in the system. It is inefficient to leave the repeater transmitters on when there is no information to transmit. Therefore, to service each subscriber rapidly, the transmitters should be activated in a reasonably short amount of time to prevent delays in access to the repeater system. Furthermore, it is desirable to activate the transmitters without supplying an additional control line to each repeater. Communications which are conducted over the repeater system must not be misinterpreted for control signals to the transmitters to ensure that the subscribers cannot accidentally disable the transmit control system.

Therefore, there is a need in the art for a transmit control system which provides rapid activation of a number of transmitters. The transmit control system should use efficient control means to provide control to the separate transmitters. The transmit control system also should provide safeguard against accidental activation or deactivation of the transmitters in the system.

SUMMARY OF THE INVENTION

The present invention is a system for controlling one or more remote sites using an in-band signalling tone and a specialized detection system.

In one application, the remote sites include transmitters which are disabled when a signalling tone is received. Receipt of the signalling tone indicates that no transmissions by the central site are in progress. Once the signalling tone is extinguished, the transmitters are activated to broadcast information sent by the central site.

The detection system located at each remote site monitors energy residing in the spectral region assigned to one or more in-band signalling tones. If a signal is detected in this spectral region, then energy in another spectral region is measured to determine if the signals are signalling tones or harmonics of voice or data information being transmitted by the system. If the energy in the data and voice portions of the spectrum is relatively low, then the system is receiving a signalling tone, and the transmitters are disabled.

One embodiment of the present transmit control system monitors data transmissions made by the repeater system to determine whether the signal received in the spectral range of the signalling tone is actually a signalling tone or harmonic noise.

One embodiment of the present transmit control system monitors signals in the voice band of interest to verify the signal received in the spectral range of the signalling tone.

BRIEF DESCRIPTION OF THE DRAWINGS

In the drawings, where like numerals describe like components throughout the several views:

FIG. 10 is a timing diagram showing one embodiment of a two stage detection system;

FIG. 14 is one example of the audio portion of the remote site controller according to one embodiment of the present invention.

DETAILED DESCRIPTION

In the following detailed description of the preferred embodiment, references are made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the spirit and scope of the present invention. The following detailed description is, therefore, not to be taken in a limiting sense, and the scope of the present invention is defined by the appended claims and equivalents thereof.

Applicants hereby incorporate by reference the copending patent applications filed even date herewith entitled: SIMULTANEOUS BROADCAST MANAGEMENT SYSTEM, Ser. No. 08/630,673, BANDWIDTH MANAGEMENT SYSTEM FOR A REMOTE REPEATER NETWORK, Ser. No. 08/628,981, and LINK DELAY CALCULATION SYSTEM USING ZERO CROSSING DETECTION, Ser. No. 60/015,311

Figure 1:
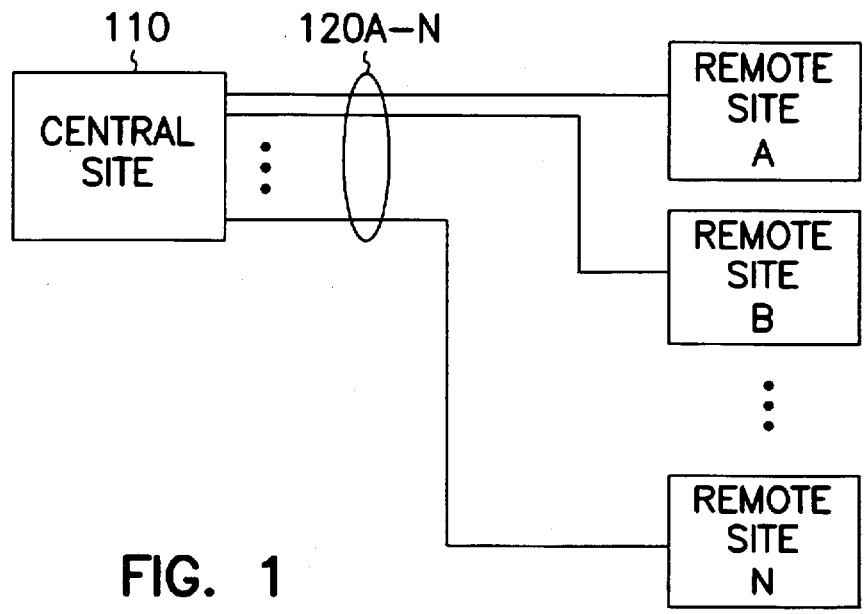
FIG. 1 is a block diagram showing one environment in which the present transmit control system may be practiced.

One environment in which the present transmit control system may be practiced is shown in FIG. 1. The present transmit control system is demonstrated in this environment, however, this example is not intended to be exclusive or limiting, and other applications and environments exist which do not depart from the scope and spirit of the present invention.

Central site 110 controls the transmissions emanating from remote sites A–N. For instance, in one embodiment the central site 110 enables transmissions from remote sites A–N when central site 110 has information to send, and disables transmissions when central site 110 does not have information to send.

In one embodiment links 120A–N are digital T1 links. In another embodiment links 120A–N are line of sight optical links. Other types of links may be used without departing from the scope and spirit of the present invention.

In trunked mobile radio systems the remote sites A–N are remote repeaters which receive information from central site 110 and retransmit the information to a plurality of (mobile) subscriber units (not shown). Such systems often transmit voice signals and data signals between the subscriber units and the remote sites. In one such system, the transmissions include audio (300 Hz to 3 KHz) plus supervisory tone data, audio (300 Hz to 3 KHz) plus low speed (3.0 to 3.3 KHz) data which may be shifted upband, and high speed data (300 Hz to 3 KHz).

In such systems it is desirable to control the remote site transmissions with a minimal amount of disruption to the communications between the subscriber units and the remote sites. This means that the remote sites A–N must detect signals from the central site 110 in a relatively short amount of time so that the subscriber units can access the remote sites.

In-Band Tone Transmit Control

In one embodiment an in-band tone control is used by the central site 110 to control the remote sites A–N. The presence or absence of an in-band tone generated by the control site 110 is detected at the remote sites A–N. For the tone not to interfere with call information, such as in-band voice or data, the tone should not be present during a call. In one embodiment, a tone is transmitted by the central site when the central site 110 has no information to broadcast over the remote sites A–N. When the tone is absent the central site 110 has information to transmit to the remote sites. This embodiment also has the advantage of working with any link, since the tone is in-band, and the tone generation and detection modules are independent of the link.

The use of an in-band tone control introduces the false signalling and the signal blocking effects. False signalling is a condition where the detection module erroneously detects a signal which is not the in-band transmit control tone. Signal blocking is the condition where the detection module fails to detect the in-band transmit control tone due to interference with other information transmitted over the link. Both effects are competing, since as the sensitivity of the detection module is increased the likelihood of signal blocking diminishes, but the false signalling likelihood increases. Also if the detection module sensitivity decreases, then the false signalling effect is decreased and the signal blocking effect increases. Therefore, the present in-band tone control system must provide features to balance the false signalling and signal blocking effects.

The present control system decreases signal blocking by using an in-band tone in a frequency portion which is not within the high energy portion of the voice spectrum. Most of voice energy lies between 500 to 700 Hz with harmonics falling off in frequency. Some link systems do not transmit the lower frequency ranges (such as 0–300 Hz), therefore one embodiment of the present system uses a 2600 Hz tone. Other tones may be used, provided they are not within the statistically high energy portion of the transmissions and the tones are within the bandpass range of the link. False signalling is reduced since the detection module detects the control tone and then investigates energy in other spectral portions to ensure that the detected tone is not a harmonic (or subharmonic) of the audio signals transmitted over the link (in this example, voice signals).

For example, if the 2600 Hz tone is detected and substantial energy is detected in the 1300 Hz and 650 Hz spectral portions, then it is likely that the 2600 Hz signal is really voice or data energy. If the energy detected in the 1300 Hz and 650 Hz spectral portions is relatively minor, then it is likely that the 2600 Hz tone is the control tone and not voice or data energy.

Another check is to compare the energy in the 2600 Hz frequency range with the energy found in the remaining portion of the link passband to determine if the 2600 Hz signal is truly the control signal. In one embodiment this is achieved using a notch passband filter to detect the 2600 Hz signal and a notch stopband filter to detect the remaining spectral range.

Figure 2:
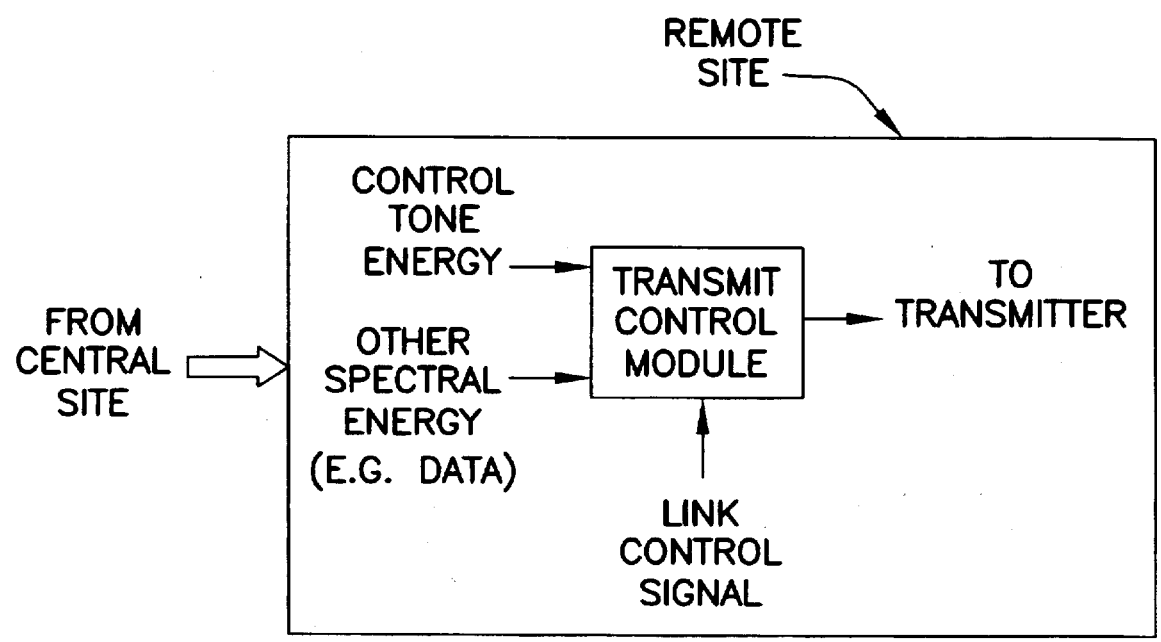
FIG. 2 is one example of a transmit control module according to one embodiment of the present invention.

This embodiment of the present transmit control system monitors energy in the spectral region of the control tone and absence of energy in other spectral regions to determine whether the control signal is present. FIG. 2 shows the inputs and outputs for one embodiment of the in-band tone transmit control module. The permutations for this embodiment are provided in Table I.

TABLE I

Transmit Control Inputs and Outputs

| Call State | Control Tone Spectral Region | Other Spectral Regions | Transmit State |
|---|---|---|---|
| absent | signal detected | no signals detected | disabled |
| absent | signal detected | signals detected (abnormal) | enabled |
| present | no signal detected | no signals detected | enabled |
| present | no signal detected | signals detected (normal) | enabled |

As shown in Table I, in the case where only the control tone is detected the transmissions from the remote site are disabled. Otherwise, they are enabled. The second state is abnormal, since signals are detected despite the absence of call information.

One consequence of the present system is that if the link is broken for any reason the remote sites are enabled, since the control tone from the central site is disabled with the link. Alternate embodiments incorporate link information into the transmit control module from the link control module (described below) to control the transmit state in the event that a link fails.

Other energy comparisons may be performed without departing from the scope and spirit of the present invention, and the examples provided herein are not intended to be exclusive or limiting. For example, in environments where low speed data signals are transmitted by the system, the data frequency range may be used as the "other spectral region" energy to detect whether a call is being handled by the system.

Figure 4:
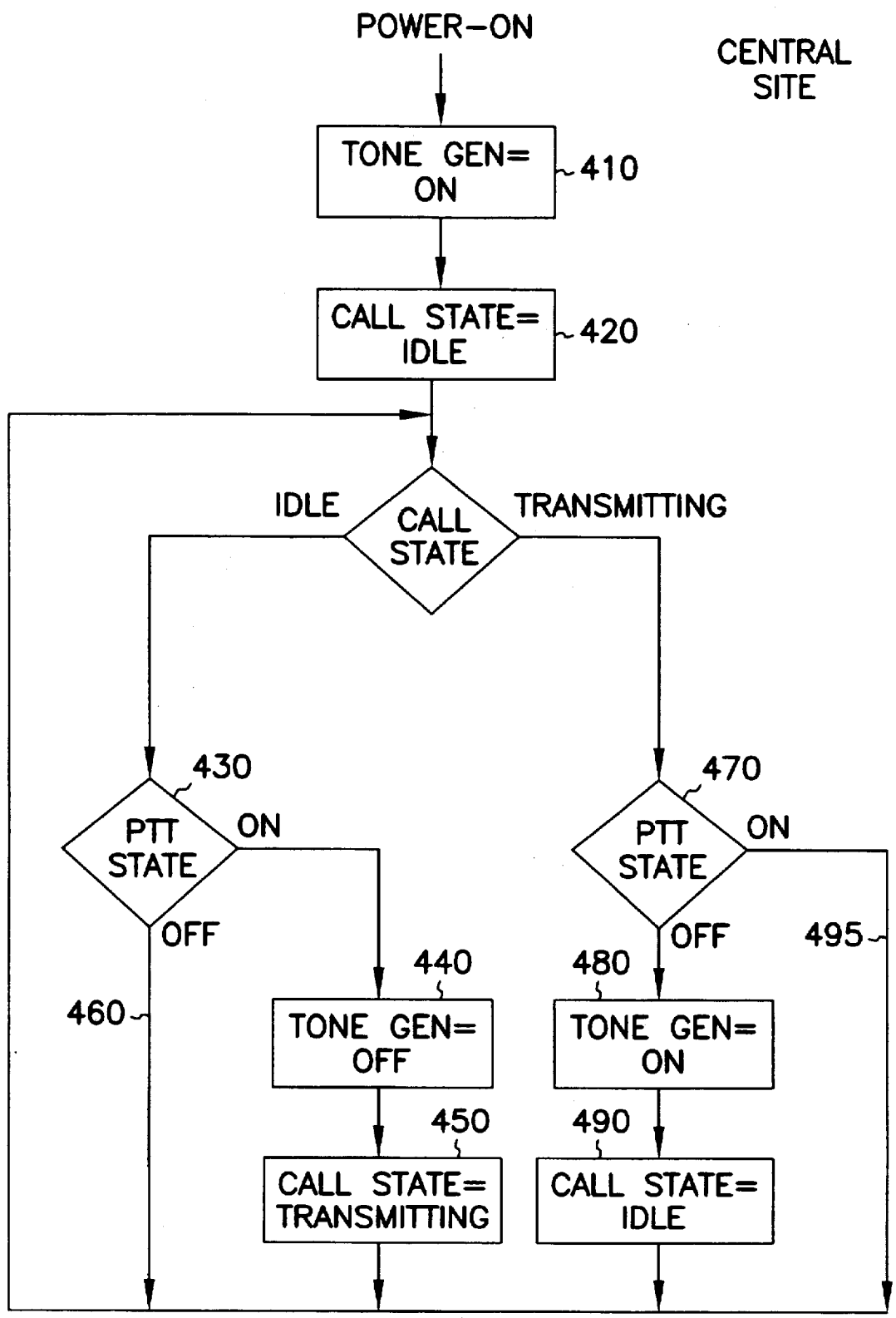
FIG. 4 is a flow chart of the operation of one embodiment of a central site control system.

FIG. 4 shows tone generation at the central site 110 according to one embodiment of the present invention. After a power on of the system the tone generator is enabled 410 and the call state of the system is set to idle 420. If a subscriber unit is requesting a transmission then the central site 110 deactivates the tone generator 440 and sets the call state to transmitting 450. If no transmission was requested by the subscriber unit 460 the call state remains idle and the central site continues looping until a transmission is requested. After a transmission has been initiated the tone is inhibited during the call 495 and until the transmission is done 480, 490.

Figure 5:
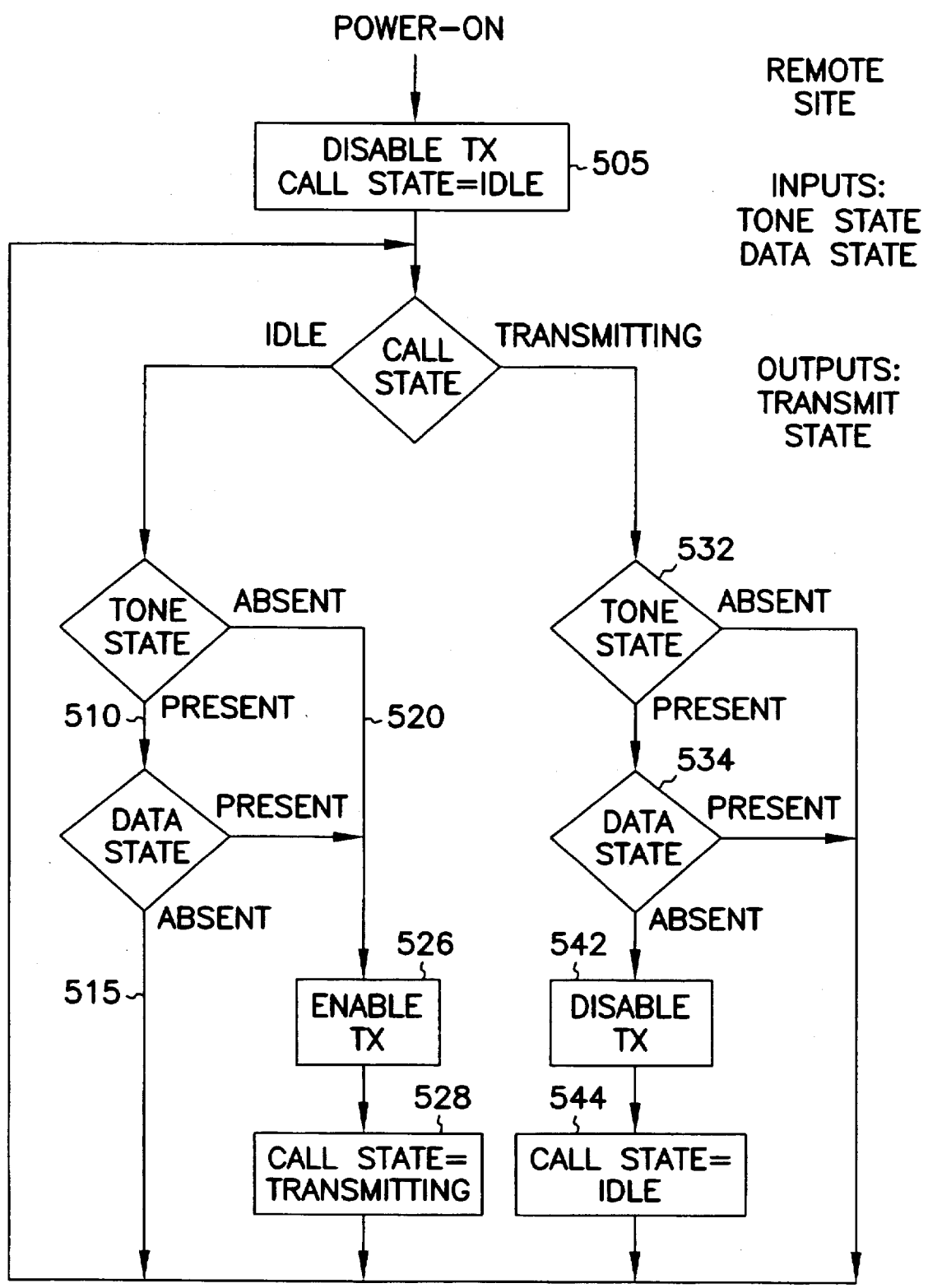
FIG. 5 is a flow chart of the operation of one embodiment of a remote site control system.

FIG. 5 shows one embodiment of the transmit control system wherein data is used as the "other spectral region" signal. After power on the transmitter is automatically disabled and the call state is set to idle 505. If a tone is detected 510 but there is no other wideband energy (a data signal in this example) 515 then the state remains idle and the tone indicates no transmission. Once the tone is absent or a data signal is detected 520 the transmitter is enabled 526 and the call state is changed to transmitting 528. The system remains in this state until a tone is again detected 532 and no transmission energy (data energy, in this example) is detected 534. Upon receipt of a tone and no other data the transmitter is disabled 542 and the call state reverts to idle 544. It should be noted that the data energy of this example could be substituted with any other signal energy, such as voice band energy, as long as it is not the tone energy, without departing from the scope and spirit of the present invention.

In trunked radio applications it is desired that the transmit control function perform so that the subscriber unit handshake time is not increased by more than approximately 50 milliseconds. Other applications may allow for shorter or longer latency periods.

In-Band Tone Link Control

The link control module provides information as to whether the link is up or down. The link control module also provides a signal to an alarm module for failure alarm purposes.

In one embodiment the link control module detects wideband energy, which is any energy within the passband of the link. When a call is not present, the wideband energy is energy from the signalling tone and when a call is present it is low-speed data energy (provided the system transmits low speed data during calls). The link is determined to be "up" whenever there is wideband energy and "down" if there is no wideband energy.

Figure 3:
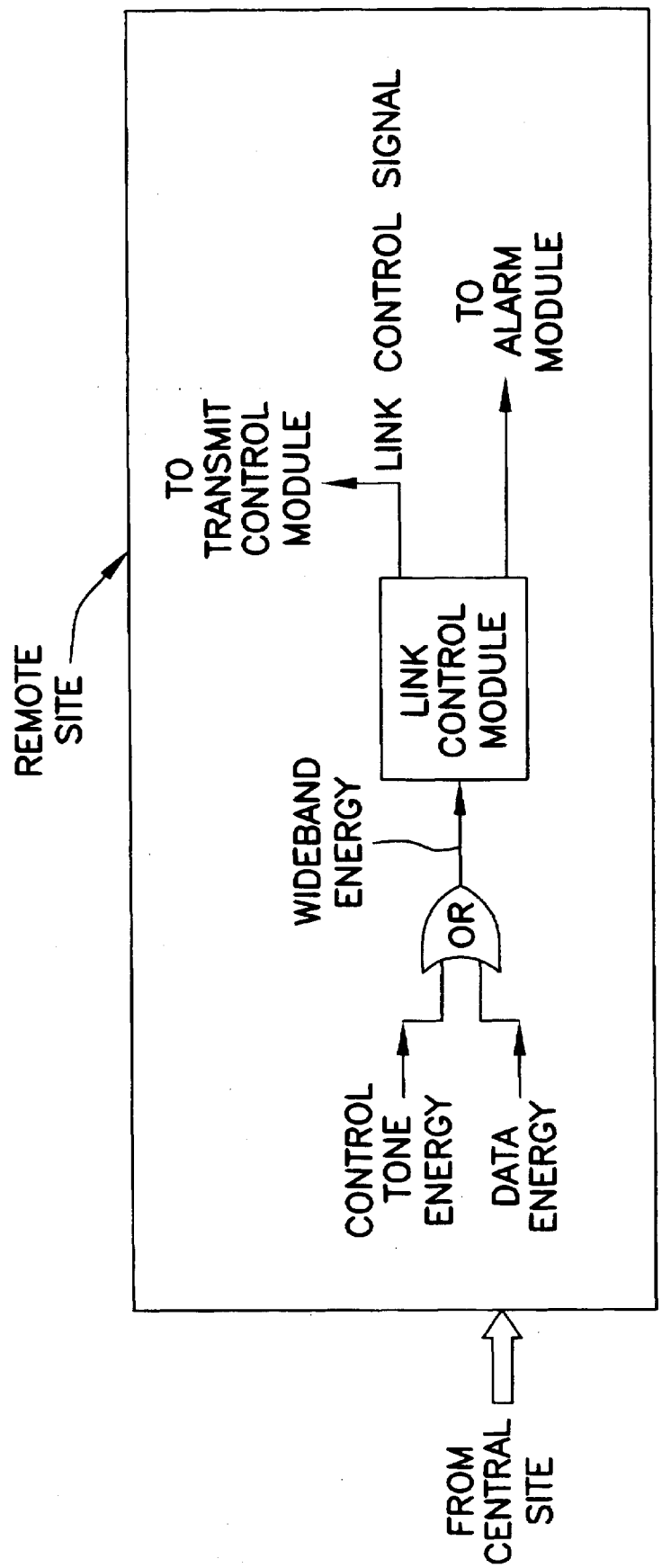
FIG. 3 is one example of a link control module according to one embodiment of the present invention.

FIG. 3 shows one embodiment where signals representing energy in the spectral vicinity of the control tone and energy in the data spectral region are logically "ORed" to indicate wideband energy. This embodiment uses the control tone energy and data energy signals used by the transmit control module, and is an example of an alternate system for link control. Again, the link is determined to be "up" whenever there is wideband energy and "down" if there is no wideband energy.

Alternate embodiments provide link control using parameters independent of the transmit control parameters.

Measurement of wideband energy is relatively straightforward for a continuous tone, however for data signals, the measurement may fluctuate. To prevent oscillation of the link control signal in one embodiment the wideband energy is monitored over the interval of approximately one second to determine if wideband energy is present. Other times may be used so long as the link control signal is not substantially delayed.

Figure 6:
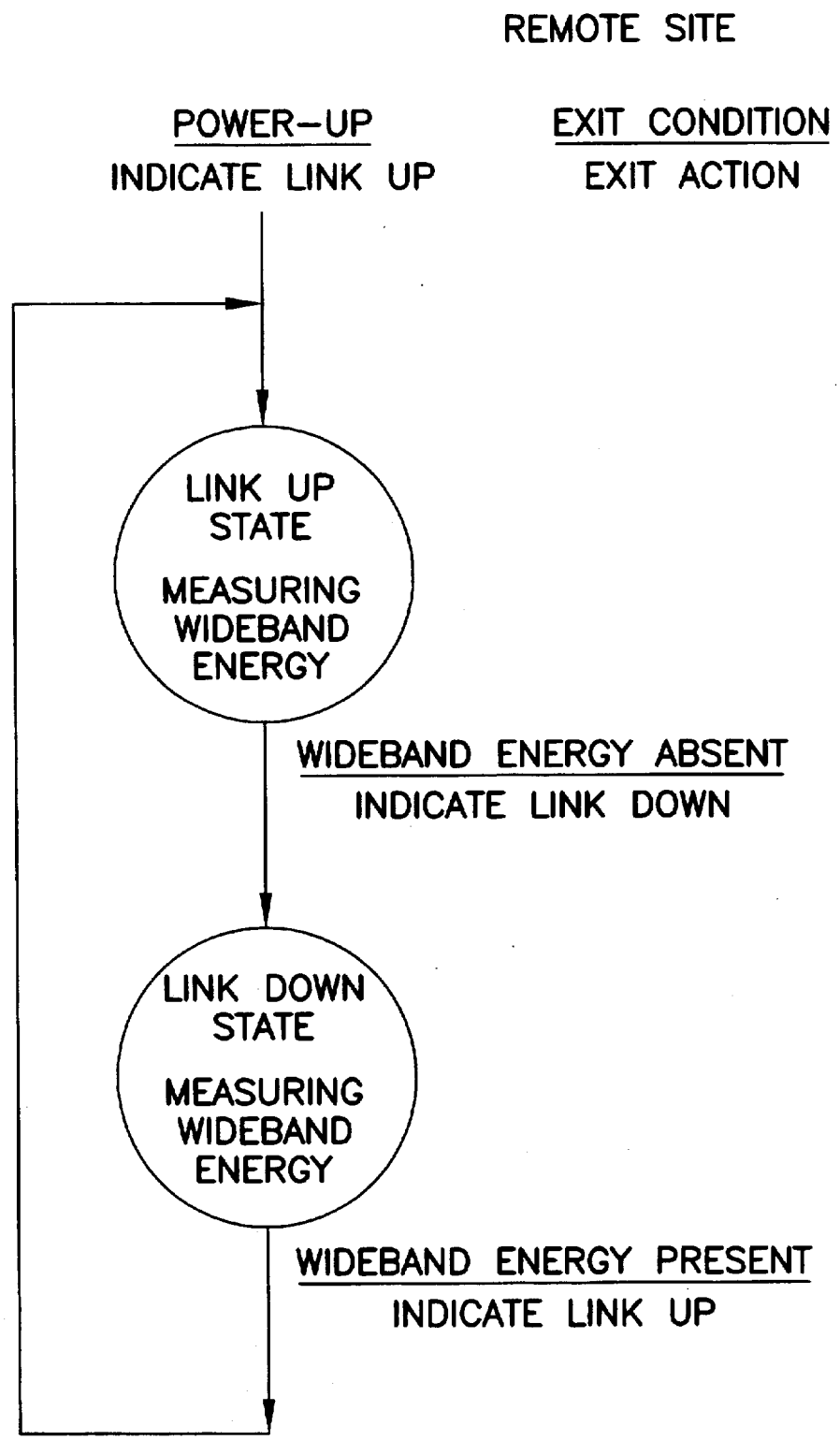
FIG. 6 shows a link state diagram, according to one embodiment of the present invention.

FIG. 6 shows one embodiment in which the link is "up" as long as the wideband energy is present, and "down" when it is absent.

Figure 7:
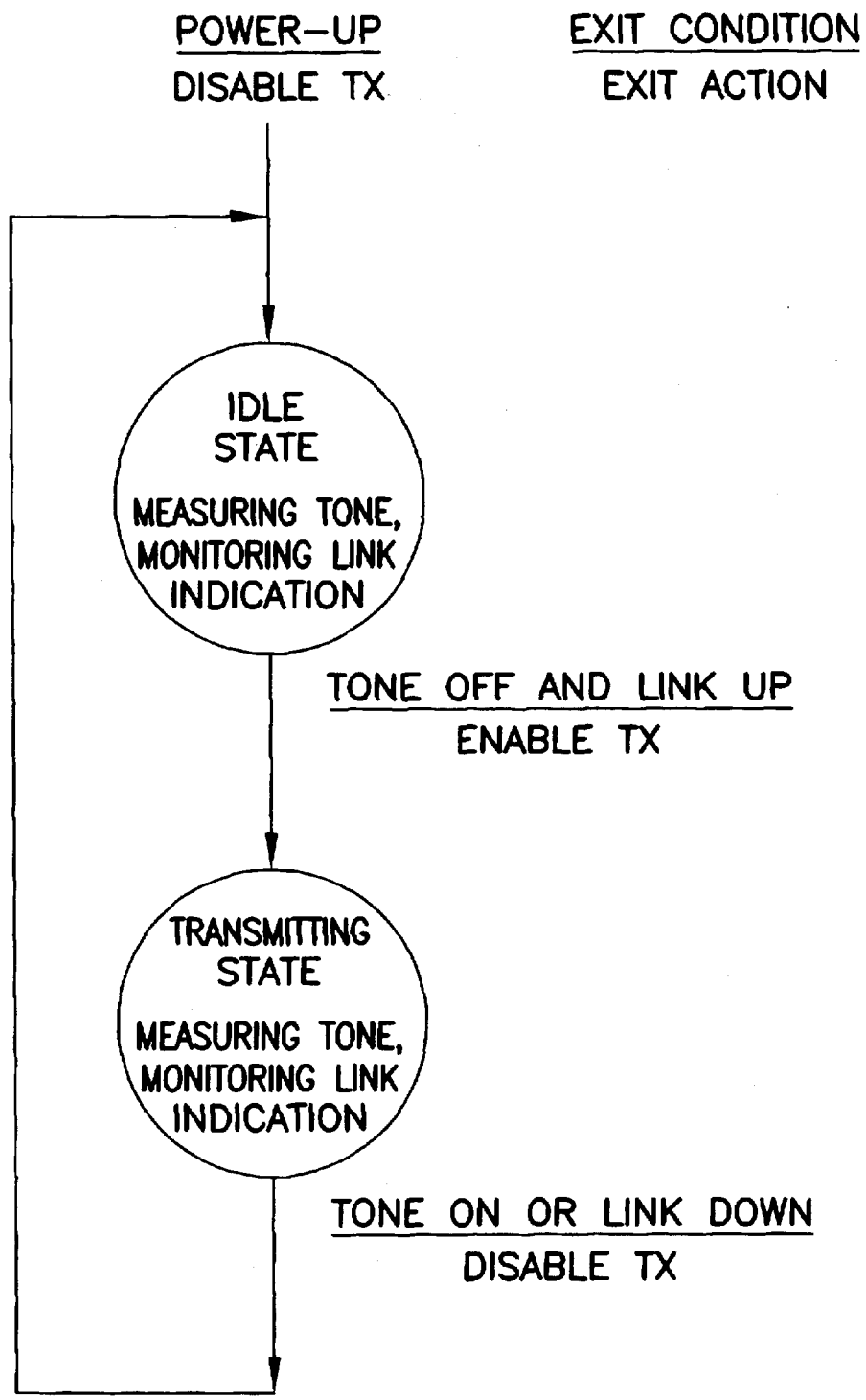
FIG. 7 shows a transmit state diagram, according to one embodiment of the present invention.
Figure 8:
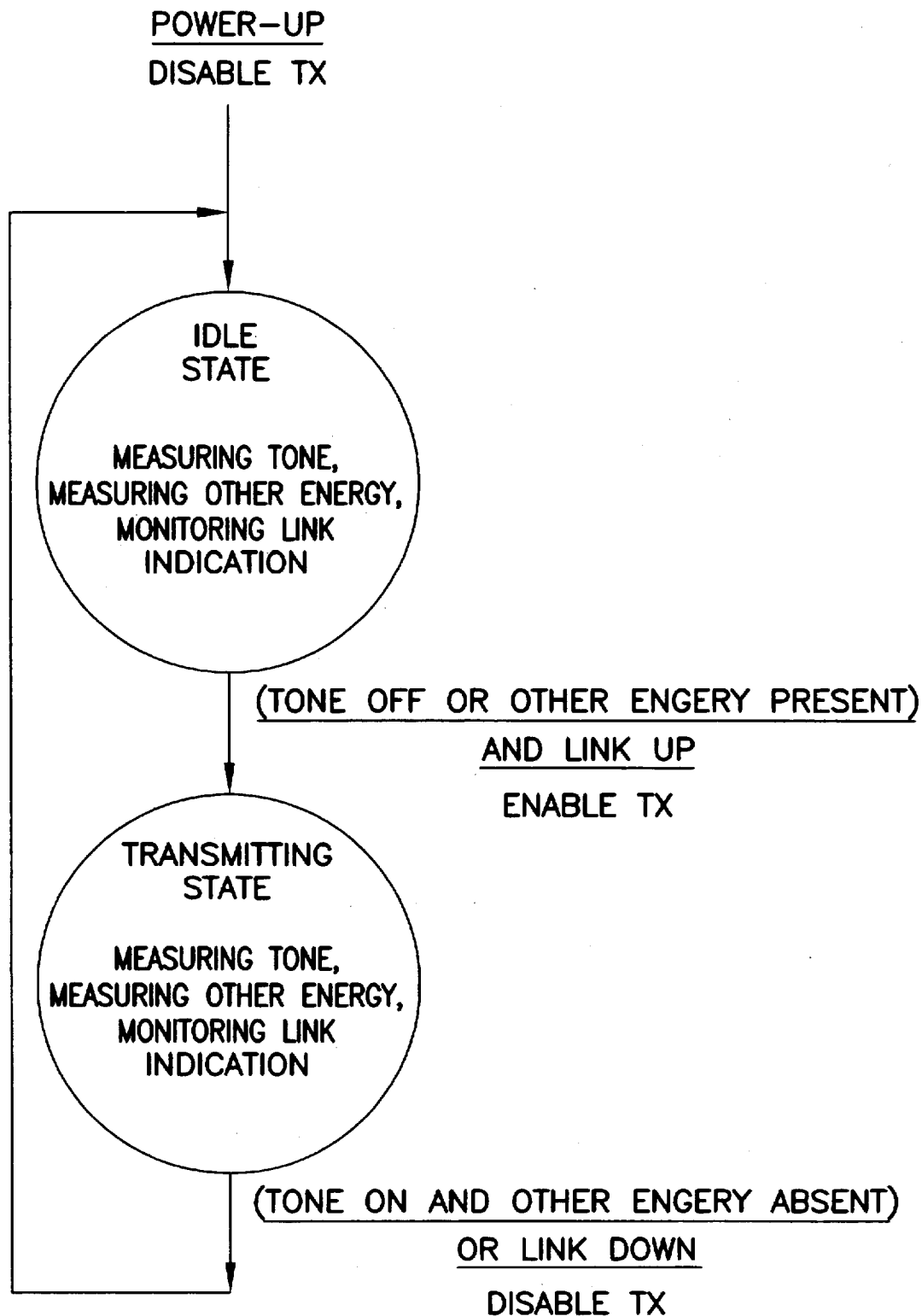
FIG. 8 shows a transmit state diagram, according to one embodiment of the present invention.

FIG. 7 shows a transmit control state diagram according to one embodiment of the present system which incorporates tone information and link information into enabling or disabling the transmitter. FIG. 8 shows an alternate embodiment which incorporates wideband energy as well as tone and link information.

Figure 9:
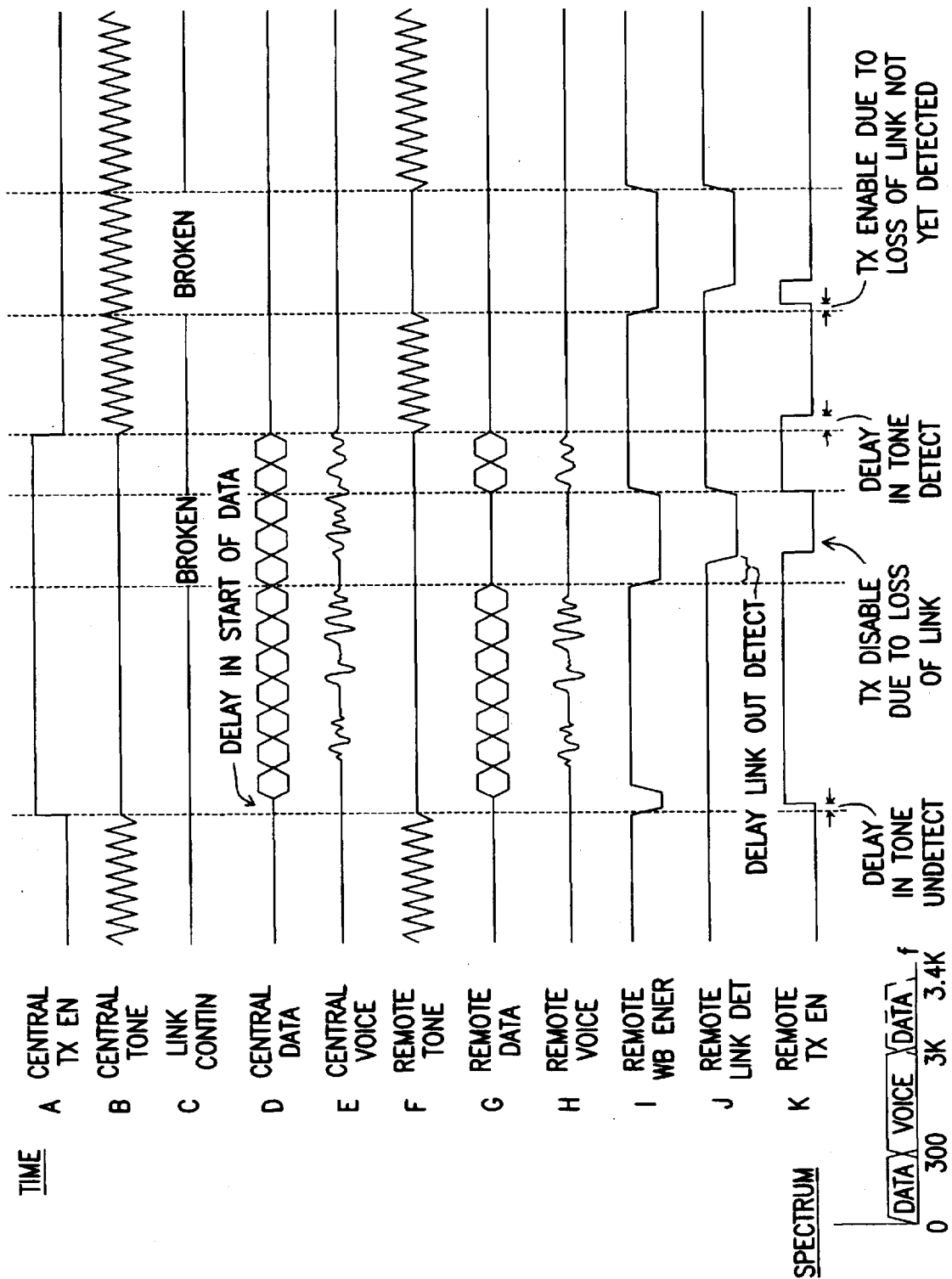
FIG. 9 is a timing diagram showing the operation of one embodiment of the present transmit control system.

FIG. 9 shows signals in one embodiment of the present invention and demonstrates the transmit control and link control of this embodiment. Traces A and B demonstrate that the tone signal is inhibited when transmissions from the central site 110 are being performed. Trace C illustrates how the system functions during a link malfunction. The central site 110 data (trace D) and voice (trace E) are transmitted to the remote site when the remote site tone is inhibited (trace E).

The data and voice information received by the remote site is as good as the link quality (traces G and H). The remote site wideband energy, trace I, is the logical OR of the remote site tone (F) and remote site data (G) (for purposes of this example, the data and voice transmissions are overlapping in time, yet this may differ in other systems. In those systems the wideband energy would have to be the logical OR of traces F, G, and H.)

Traces J and K demonstrate the effect of the averaging of the remote wideband energy signal (I) to avoid needless drops in the link and unnecessary keying and unkeying of the remote site transmitter.

Tone Detection System

In one embodiment the tone detection is provided by a bandpass filter, rectifier, low pass filter, and threshold comparison. The bandpass filter output and the low pass filter output are compared to determine whether the tone is present and the other transmissions are absent.

Another embodiment incorporates a digital signal processor (DSP) executing a Discrete Fourier Transform (DFT) to detect the tone, since a single tone is used to inhibit the transmissions. A Fast Fourier Transform (FFT) calculates the entire spectrum for N samples and involved N log N complex computations. The DFT only requires $N^2$ complex computations generally. But for a single frequency, it requires only N complex computations.

Another embodiment uses a modification of a Goertzel algorithm executing on a DSP, followed by direct threshold comparison, to perform a time to frequency transformation of the input signal and compare the tone frequency with other frequencies in the signal. This provides an efficient spectral comparison of the elements of the signal arriving from the central site 110. The modified Goertzel algorithm is described in the book entitled "Digital Signal Processing Applications", Volume 1 of 2, by Analog Devices, Inc. 1992. The modified Goertzel algorithm is described in detail in pages 457 to 465. This method involves a repeated operation of a feedback method and a feedforward method, which is used to generate a result indicating the energy present in a spectral region of interest. The modified Goertzel algorithm simplifies calculations by the DSP and increase the efficiency and speed of the tone detection. This system squares all terms and computes the magnitude squared of the frequency of interest, which reduces each complex coefficient of the calculation to a single real coefficient. The single real coefficient may be used to calculate every term of the summation. This system also operates on samples as they are input into the system which increases throughput of the DSP.

FIG. 10 shows the benefits of signal filtering of the transmitter signal to prevent short toggling of the transmitter at the remote site (traces A–D). The input signal (A) is compared to generate an absence signal (B). The absence signal is integrated (C) and digitized (D) to produce the switching signal shown in trace D. The process creates a low frequency representation of the input signal to prevent toggling the output signal for minor variations in the input signal. An integration of trace E is shown in Figure F, which is then digitized to produce trace G. The averaging method creates an energy/tone detection which is substantially independent of the actual tone level.

Figure 11:
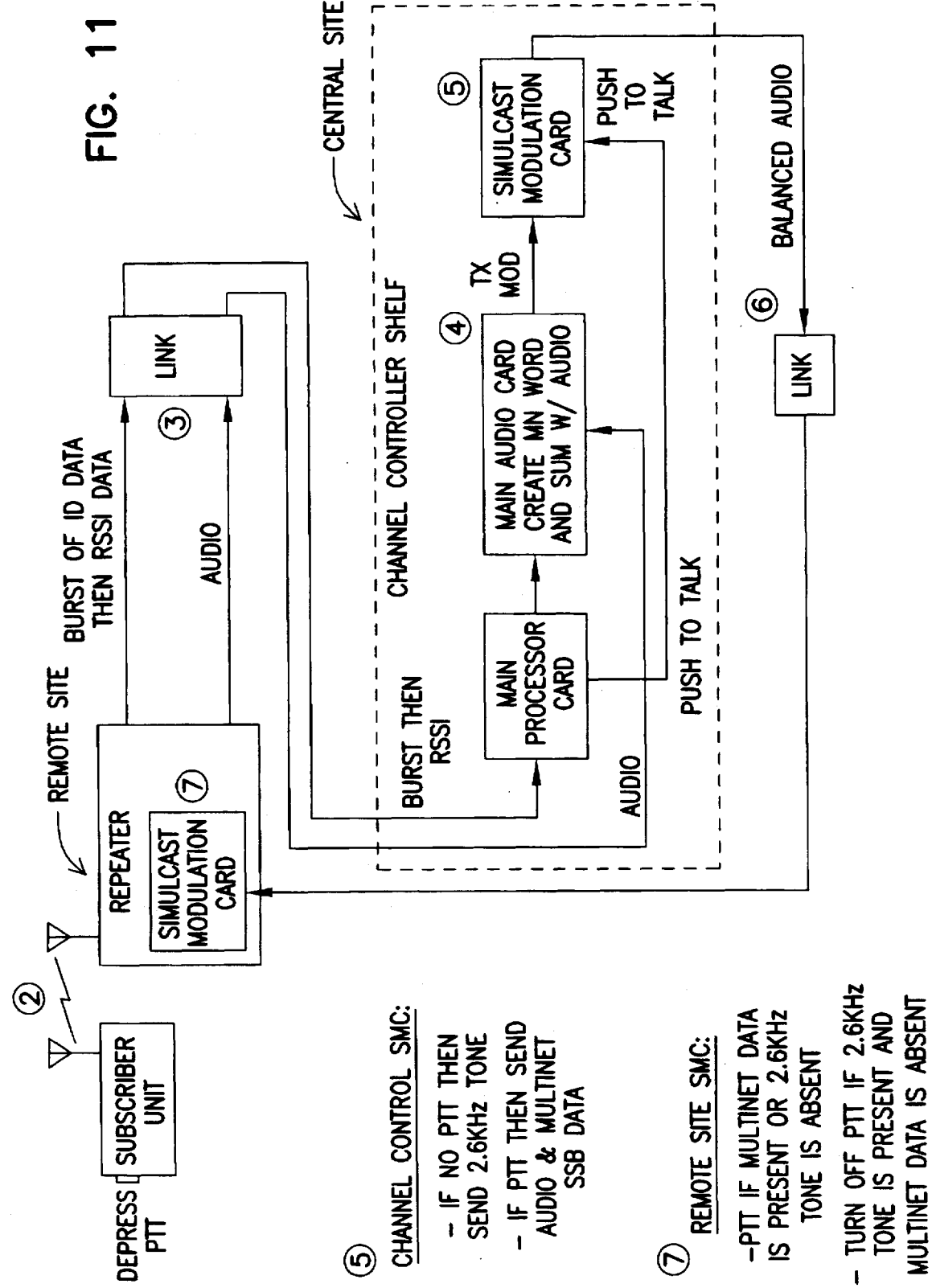
FIG. 11 is an example of the operation of one application of the present transmit control system.

FIG. 11 demonstrates one example of a transmit control system. Assuming that the system is not transmitting, a control signal of 2600 Hz is transmitted to the repeater by the central site to indicate an inactive transmission state. The subscriber unit requests a channel for transmission from its local repeater. Information about the subscriber unit's request is transmitted by the repeater to the channel controller at the central site over the link. If the controller verifies that the channel is free, the channel controller terminates the control signal. The repeater detects the loss of the control signal and activates the transmitter. The central controller then transmits control and voice information to the repeater for rebroadcast by the repeater.

Figure 12:
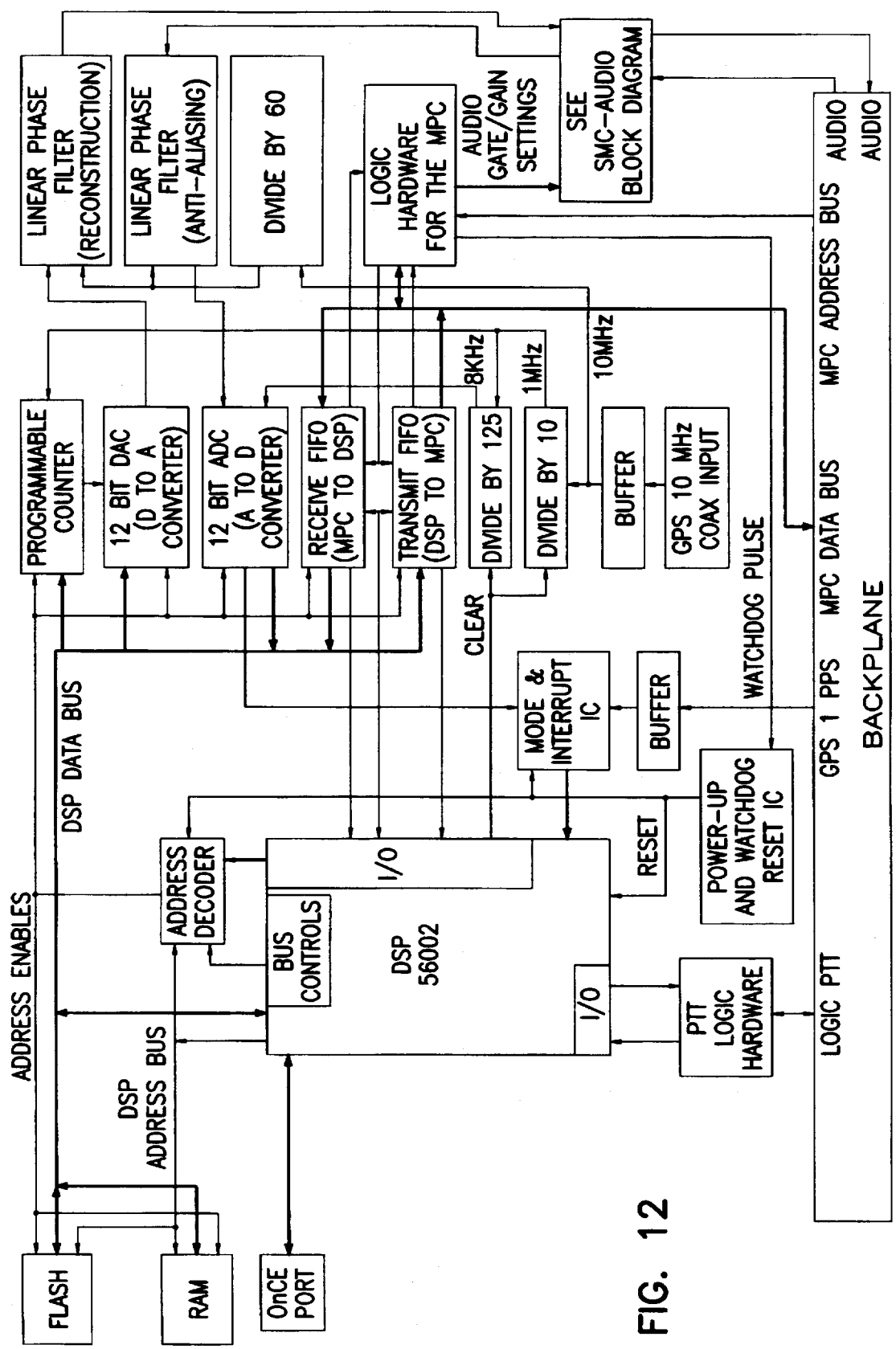
FIG. 12 is one example of an in-band tone detection system according to one embodiment of the present transmit control system.
Figure 13:
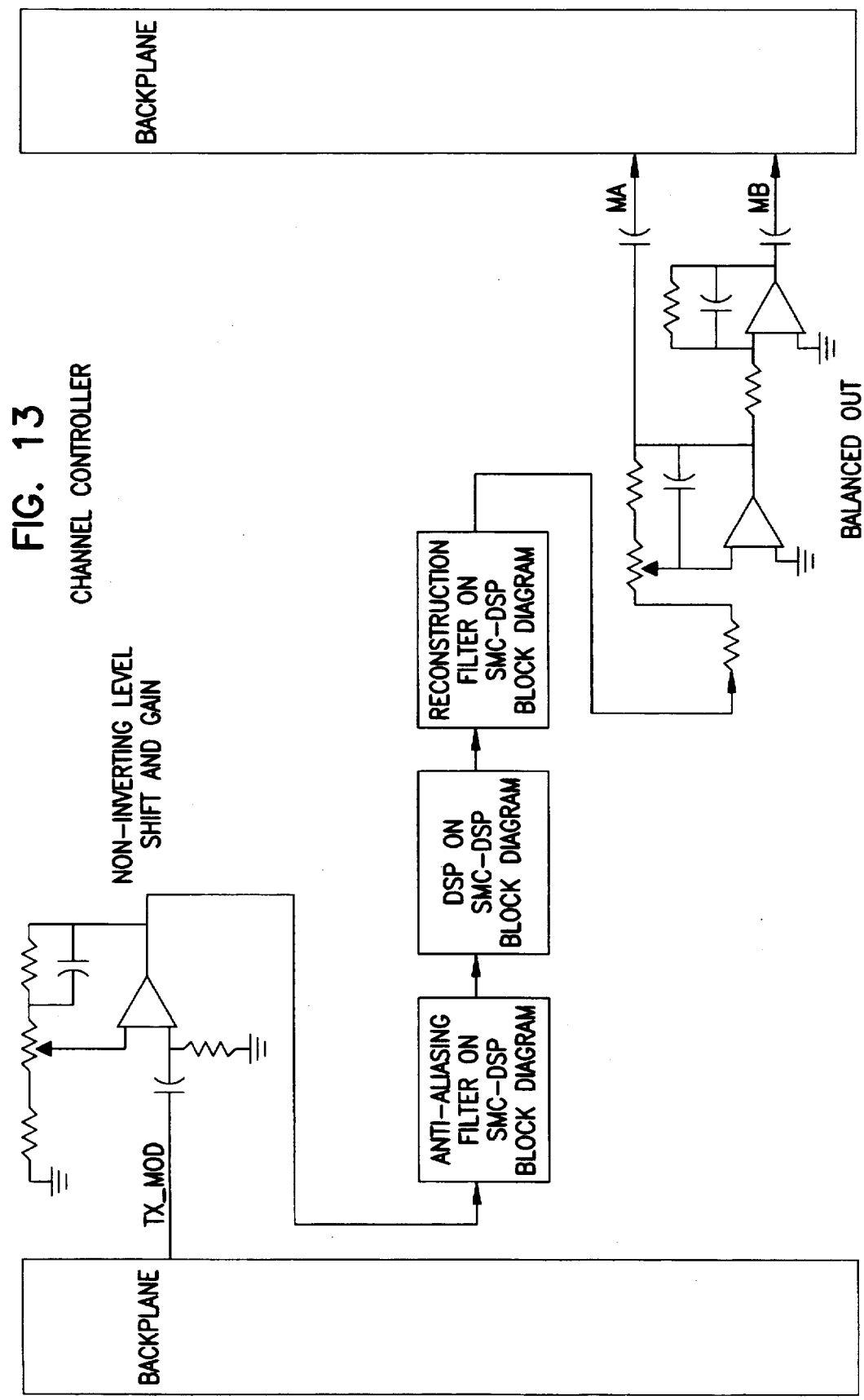
FIG. 13 is one example of the audio portion of the central site controller according to one embodiment of the present invention.

FIG. 12 shows one embodiment of a DSP system for control signal detection. DSP 56002 executes the modified Goertzel algorithm and detects the tone transmission from the central controller. Data signals are monitored as the second source of spectral information and are used in the control systems shown in FIG. 5 and described above. Further details of the audio block diagram are provided in FIGS. 13 and 14, at the central controller site and remote site, respectively.

What is claimed is:

1. A method for transmit control in a repeater system, comprising the steps of:
    transmitting an in-band tone of frequency F when a central site has no information to transmit over one or more remote sites, and inhibiting the in-band tone when the central site has information to transmit over the one or more remote sites; and
    at each of the one or more remote sites, controlling a transmitter, by the steps including:
        analog to digital converting the in-band tone to create a digitized in-band tone;
        detecting the digitized in-band tone using a processor;
        if the in-band tone is detected and if measured signals from a different spectral region are substantially absent, disabling a transmitter at the remote site; and
        if no in-band tone is detected, activating the transmitter.

2. The method of claim 1, wherein the different spectral region is a data spectral region.

3. The method of claim 1, wherein the different spectral region is a voice spectral region.

4. The method of claim 1, wherein the step of detecting comprises the step of using a modified Goertzel measurement system to detect the in-band tone.

5. The method of claim 1, wherein the step of transmitting further comprises the step of transmitting a 2600 Hz in-band tone.

6. A method for transmit control in a repeater system, comprising the steps of:
    analog to digital converting an in-band tone to create a digitized in-band tone;
    detecting the digitized in-band tone using a processor, the in-band tone transmitted by a central site when the central site has no information to transmit over one or more remote sites and the in-band tone inhibited when the central site has information to transmit over the one or more remote sites;
    if the in-band tone is detected, measuring signals from a different spectral region, if signals from the different spectral region are substantially absent, then disabling a transmitter at a remote site; and
    if no in-band tone is detected, activating the transmitter.

7. The method of claim 6, wherein the different spectral region is a data spectral region.

8. The method of claim 6, wherein the different spectral region is a voice spectral region.

9. The method of claim 6, wherein the step of detecting comprises the step of using a modified Goertzel measurement system to detect the in-band tone.

10. The method of claim 6, wherein the in-band tone is a 2600 Hz in-band tone.

11. A method for transmit control in a repeater system, comprising the steps of:
    transmitting an in-band tone of frequency F when a central site has no information to transmit over one or more remote sites, and inhibiting the in-band tone when the central site has information to transmit over the one or more remote sites, wherein the in-band tone is for analog to digital conversion and detection at a remote site, and if the in-band tone is detected and if signals from a different spectral region are substantially absent, disabling a transmitter at the remote site.

12. The method of claim 11, wherein the different spectral region is a data spectral region.

13. The method of claim 11, wherein the different spectral region is a voice spectral region.

14. The method of claim 11, wherein a modified Goertzel measurement system is used to detect the in-band tone.

15. The method of claim 11, wherein the step of transmitting further comprises the step of transmitting a 2600 Hz in-band tone.

16. A transmit control system, comprising:
    an in-band tone generator for generating an in-band tone when a central site has no information to transmit;
    an analog to digital convertor for converting signals in a spectral vicinity of the in-band tone;
    a processor, located at a remote site, for detecting an in-band tone from samples generated by the analog to digital convertor; and
    a comparator for comparing signals generated by the analog to digital convertor and signals from a different spectral area.

17. The system of claim 16, further comprising a transmission inhibitor for disabling a transmitter at the remote site if an in-band tone is detected and energy in a different spectral region is not detected.

18. The system of claim 16, wherein the processor executes a modified Goertzel algorithm for detecting an in-band tone signal.

19. The system of claim 16, wherein the in-band tone generator generates a 2600 Hz tone.

20. The system of claim 16, wherein the signals from a different spectral area comprise data signals transmitted by the central site.

21. A method of link detection, comprising:
    monitoring signals from a central site, including monitoring a predetermined spectral region for presence of an in-band tone;
    if an in-band tone is detected, signalling an active link; and
    if the in-band tone is not detected and if wideband spectral energy is substantially absent over an interval of time, signalling an inactive link;
    wherein the interval of time is selected to avoid errors in detection during fluctuation of signals from the central site.

* * * * *